Patented Apr. 20, 1954

2,676,162

UNITED STATES PATENT OFFICE 2,676,162

FIRE RETARDANT COATING COMPOSITIONS CONTAINING A REACTION PRODUCT OF PHOSPHORYL CHLORIDE AND ANHYDROUS AMMONIA AND ARTICLES COATED THEREWITH

Ralph Marotta, Malden, Mass., assignor to Monsanto Chemical Company, St. Louis, Mo., a corporation of Delaware No Drawing. Application June 28, 1949,
Serial No. 101,920

18 Claims. (Cl. 260—38)

The present invention relates to fire-retardant compositions, and it more particularly relates to potentially intumescing, fire-retardant coating compositions for the coating of paper, wood, plastic and metal surfaces to protect such surfaces from fire or heat.

Various fire-retardant coating compositions have been suggested heretofore including compositions which intumesce when exposed to an open flame or heat. However, these prior art compositions are not suitable for all purposes in that they either are not suitable for exterior use or contain water-soluble fire-retardant ingredients which leach out of the coating, or else do not provide adequate protection from fire for wood and metal surfaces.

It is one object of this invention to provide improved potentially intumescing fire-resistant coating compositions for use on paper, wood, plastic or metal surfaces and other substrates.

A further object of this invention is to provide improved fire-retardant coating compositions which form coatings possessing excellent film properties, water-resistance and good resistance to weathering, and also possess the property of intumescing to form a heat insulating layer when exposed to an open flame or heat.

A further object of this invention is to provide improved potentially intumescing, fire-retardant coating compositions which air dry and cure at room temperatures in a reasonably short time.

Still further objects and advantages of this invention will be apparent from the following description and the appended claims.

The coating compositions of this invention comprise, in general, a reaction product of anhydrous ammonia and phosphoryl chloride; a thermosetting resin, for example, a heat-convertible phenol-formaldehyde resin, or a heat-convertible aminoplast resin of which condensation products of urea or melamine with formaldehyde or alkylated derivatives thereof are illustrative; a film-forming condensation product of 4,4' dihydroxy diphenyl dimethyl methane having the structural formula:

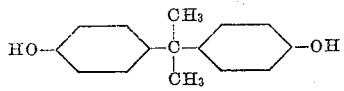

with epichlorohydrin; and an organic vehicle which includes an organic solvent for the last named condensation product. The condensation product of 4,4' dihydroxy diphenyl dimethyl methane with epichlorohydrin should be sufficiently condensed so that it will form films, whereas the thermosetting resin may serve as a film-forming material or as a filler, or may be omitted entirely. In those instances where it is desired to use the thermosetting resin as a film-forming material, the organic solvent employed in the above coating compositions should also be compatible with the thermosetting resin, that is, it should not precipitate the resin from the solution.

The above compositions air dry at room temperature to form films or coatings which are characterized by good adhesion to wood and other substrates including iron, brass and aluminum; and which possess the property of intumescing when exposed to an open flame or to heat. The fact that the coatings formed from the compositions of this invention intumesce when they are exposed to an open flame is quite surprising since none of the individual ingredients of the compositions intumesce by themselves when they are exposed to an open flame or heat. These coatings intumesce, that is, they froth or puff in such a manner that a considerably swollen, solid cellular residue, which in itself is practically non-combustible, is produced. Such residue is sufficiently continuous and adherent to protect wood or other combustible or heat damageable substrates from combustion or the deleterious effects of heat. Thus such residue protects the substrate against access of air while the coated article is subjected to an open flame, and also serves to insulate the substrate from the flame or the deleterious effects of heat.

In those instances where it is desired to obtain coatings having superior properties, it is preferable to bake the coatings, after they have been formed on a substrate, at temperatures, for example, between 225° and 450° F. for periods of from 60 to 5 minutes. By baking the coatings, it is possible to obtain coatings or films possessing superior adhesion, hardness, water-resistance, organic solvent and chemical resistance and other desirable properties as compared with the unbaked coatings.

Instead of baking the coatings as described above, similar results can be obtained by adding a small amount of an alkaline catalyst to the coating compositions before they are applied to substrates in the form of a film or coating. The addition of an alkaline catalyst generally causes an increase in viscosity or thickening of the coating compositions after about 48 hours. The initial compositions which contain the catalyst produce coatings which set up or harden rapidly on evaporation of the vehicle because the catalyst causes rapid condensation or curing of the condensation product of 4,4′ dihydroxy diphenyl dimethyl methane with epichlorohydrin. Thus, films or coatings formed from the present compositions which contain an alkaline catalyst set up or cure quickly at normal room temperature, and very rapidly by baking at relatively higher temperatures, for example, from 125° to 450° F. As examples of suitable alkaline catalysts which are useful for the above purpose may be mentioned quaternary ammonium hydroxides such as phenyl trimethyl ammonium hydroxide, tetraethyl ammonium hydroxide and the like; and aliphatic polyamines as, for example, alkylene polyamines such as diethylene triamine, triethylene tetramine, tetraethylene pentamine, ethylene diamine, propylene diamine and the like. Of the above alkaline catalysts, diethylene triamine, triethylene tetramine and tetraethylene pentamine are preferred.

In addition to the foregoing, various coating adjuncts such as fillers, pigments, plasticizers and small amounts of other film-forming materials which are compatible, may be added to the coating compositions of this invention as will be described more fully hereinafter.

The reaction products of phosphoryl chloride with anhydrous ammonia, as employed in the coating compositions of this invention, serve as fire-retardant or fire-resistant materials, although they do not actually intumesce by themselves when exposed to an open flame. Such reaction products may be prepared in various ways. However, the manner in which they are prepared has some effect on their usefulness. For example, the reaction product of phosphoryl chloride and ammonia described by Mellor in "A Comprehensive Treatise on Inorganic and Theoretical Chemistry" 8, 713 (Longmans, Green and Company, New York, 1928), which product is designated diamido diphosphoric acid, may be used. This material, however, possesses acidic properties and thus is undesirable for certain purposes, such as the coating of metal surfaces.

A preferred reaction product of phosphoryl chloride with ammonia is that prepared by reacting phosphoryl chloride with anhydrous ammonia, preferably in an organic solvent which has a normal boiling point in excess of 200° C., after which the product, while still suspended in the organic solvent, is subjected to a temperature above 155° C. for a period of time so that the water-soluble condensation product initially formed is rendered water-insoluble. The resulting product which is an infusible, water-insoluble white powder having a substantially neutral or alkaline reaction has been designated, and is referred to hereinafter, as polyphosphorylamide. The nitrogen-phosphorus atomic ratio of such amide lies in the range of 1.72:1 to 1.80:1. Polyphosphorylamide per se is infusible except when exposed to a very great heat. The preparation of polyphosphorylamide is described in greater detail in the co-pending application of John E. Malowan and Forrest R. Hurley, Serial No. 68,402, filed December 30, 1948, and entitled "Composition of Matter and Process for Same," now Patent No. 2,596,935, issued May 13, 1952, wherein the nitrogen-phosphorus atomic ratio is approximately 1.80:1, but may be varied within the range of 1.5:1 to 2.0:1.

Although all thermosetting resins may be used in the compositions of this invention, it is preferred to employ nitrogen containing thermosetting resins. Suitable nitrogen containing thermosetting resins which may be employed in the compositions of this invention are described by C. Ellis in Chemistry of Synthetic Resins, chapter 26 (Reinhold Publishing Company, 1935), and by C. Nauth in Chemistry and Technology of Plastics, chapter 3 (Reinhold Publishing Company, 1947). These nitrogen containing thermosetting resins may be designated as heat convertible aminoplasts. The term "aminoplast" has been used frequently in the past to designate resins derived from amino or amido compounds, as illustrated by the urea-formaldehyde resins (reference: Modern Plastics, 17, 433, 1939). As examples of other aminoplasts which are employable in the coating compositions of this invention may be mentioned the condensation products of formaldehyde with thiourea, guanidine, cyanamide, dicyandiamide and aminotriazines having at least two amino groups such as melamine, 2-chloro-4,6-diamino-1,3,5 triazine, 2-hydroxy-4-6-diamino-1,3,5 triazine, alkyl guanamines, aryl guanamines and the like, and other amino compounds, preferably those containing from 1 to 9 carbon atoms and having the grouping

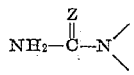

where Z is a member selected from the class consisting of O, S and N—, and where N< represents a nitrogen atom having two single valences attached to separate atoms or where the two valences represent a double bond attached to the same atom. The alkylated derivatives or modifications of the above condensation products are particularly useful also and are preferred over the simple condensation products. The condensation products may be formed by using sufficient formaldehyde to react with from at least one to all of the replaceable hydrogen atoms of the amino groups in the amino compounds. Thus in the case of condensation products prepared from melamine, the final products which are designated methylol melamine compounds may contain from 1 to 6 mols of combined formaldehyde and in the case of urea from 1 to 4 mols of combined formaldehyde.

The alkylated derivatives or modifications of the amino-formaldehyde condensation products are suitably prepared by reacting the resulting methylol amino compounds with monohydric alcohols such as methanol, ethanol, propanol, butanol and the like. All of the methylol groups or only one may be etherified in this manner depending on the amount of alcohol used and the conditions of reaction. The butylated urea-formaldehyde, butylated melamine formaldehyde condensation products (otherwise known as butyl ethers of methylol ureas or butyl ethers of methylol melamines), and butylated mixtures of melamine-formaldehyde and phenyl guanamine-formaldehyde condensation products are preferred for use in the compositions of the present invention since they give the best potentially intumescing coatings or films when employed in combination with reaction products of phosphoryl chloride and anhydrous ammonia, and condensation products of 4,4′ dihydroxy diphenyl dimethyl methane and epichlorohydrin.

The nitrogen containing thermosetting resins described above may also be prepared by using aldehydes other than formaldehyde. Thus water-soluble polymers of formaldehyde such as paraformaldehyde, trioxane and the like are particularly useful. Further, aldehydes such as acetaldehyde, propionaldehyde, furfural, glyoxal and the like may also be used. However, formaldehyde and water-soluble polymers of formaldehyde are preferred.

The compositions of the invention may be prepared in various ways. Thus, a dry mixture of the reaction product of phosphoryl chloride and anhydrous ammonia, the thermosetting resin and the condensation product of 4,4′ dihydroxy diphenyl dimethyl methane with epichlorohydrin may be prepared and then dispersed in a solvent for the last-named condensation product prior to use, or the dry mixture may be prepared without the thermosetting resin and then dispersed in a solvent for the epichlorohydrin condensation product prior to use. The compositions may also be made up and stored for a considerable period of time before they are used by mixing the above ingredients in a solvent for the epichlorohydrin condensation product. Since the reaction product of phosphoryl chloride and anhydrous ammonia is not soluble in most organic solvents, it is normally present in the compositions in dispersed form. However, it does not interfere with the clarity of films formed from the compositions unless, of course, large amounts are used. The thermosetting resin may be present in a dissolved form or in dispersed form depending upon its solubility in the particular solvent used and whether it is desired to use the resin as a film-former or as a filler.

A further understanding of the present invention will be obtained from the following examples which are intended to be illustrative of various compositions, proportions of ingredients used and the coating of various substrates, but are not intended to limit the scope of the invention, parts and percentages being by weight.

*Example I*

A composition was formulated by mixing together the following ingredients in the proportions shown:

| | Parts |
|---|---|
| Condensation product of 4,4′ dihydroxy diphenyl dimethyl methane with epichlorohydrin (medium molecular weight product—as a film former) | 25 |
| Butyl ether of a mixture of methylol melamines and methylol phenyl guanamines—as a film former (60% solids solution in butanol) | 13.8 |
| Polyphosphorylamide—as a fire retardant (white powder) | 13.3 |
| Toluol | 10 |
| Xylol | 9.9 |
| N-butanol | 10 |

The toluol, xylol and butanol serve as a mixed solvent for the epichlorohydrin condensation product and the butyl ether. In preparing the composition the polyphosphorylamide was added last. Prior to adding the polyphosphorylamide, the composition was a clear transparent liquid, which after the addition of the finely ground amide assumed a translucent appearance. When the composition thus formed was spread on wood and allowed to dry, the coating became transparent and had good clarity.

In order to cure the coating prepared from the above composition, 2.5% of diethylene triamine (as a catalyst), based on the weight of the epichlorohydrin condensation, was added thereto just prior to use. The resulting composition was then applied to maple wood by brushing and allowed to dry at room temperature. The coating thus formed was tack-free in 45 minutes and dried down overnight to a hard, water-resistant film having good clarity. After the last traces of solvent had evaporated from the film, the coated surface was exposed to the direct flame of a Bunsen burner for 5 minutes, whereupon the coating swelled to form a voluminous, practically non-combustible, cellular char which acted as an insulating blanket thereby protecting the wood from the flame. After removing the flame, the puffed char was scraped away. The underlying wood substrate was found to be undamaged by the flame.

Wood coated with the same catalyzed composition, but not subjected to the flame test, was repeatedly scrubbed with water containing 1% soap and 1% trisodium phosphate without damaging the film appearance or the potentially intumescing fire-retardant properties of the film.

*Example II*

A pigmented enamel was formulated by mixing together the following ingredients in the proportions shown:

| | Parts |
|---|---|
| Condensation product of 4,4′ dihydroxy diphenyl dimethyl methane with epichlorohydrin (high molecular weight product as a film former) | 21 |
| Butyl ether of methylol ureas—as a film former (60% solids solution in butanol) | 16.7 |
| Polyphosphorylamide—as a fire retardant (white powder) | 14.5 |
| Titanium dioxide—as a pigment | 7 |
| 2-ethoxy ethyl acetate | 21 |
| Xylol | 19.8 |

The 2-ethoxy ethyl acetate and xylol serve as solvents for the epichlorohydrin condensation product and the butyl ether of methylol urea. Separate portions of the above composition were brushed on aluminum, brass and steel, respectively, and the resulting coated articles were subsequently baked at 350° F. for 15 minutes. The baked coatings were hard, possessed high gloss, and exhibited superior adhesion and toughness. They were also resistant to water, organic solvents and chemical agents. Moreover, the coating did not fail when tested for flexibility on the conical mandril in accordance with A. S. T. M. (American Society for Testing Materials) test specification D 522–41. When the coatings were exposed to the open flame of a Bunsen burner, they intumesced to form carbonaceous insulating mats which protected the metal surfaces from permanent deformation damage.

*Example III*

A red paint was prepared by mixing the following ingredients in the proportions shown:

| | Parts |
|---|---|
| Condensation product of 4,4′ dihydroxy diphenyl dimethyl methane with epichlorohydrin (low molecular weight product—as a film former) | 27 |
| Butylated melamine-formaldehyde resin—as a film former (55% solids solution in butanol) | 9.3 |
| Polyphosphorylamide | 13 |
| Condensation product of toluene sulfonamide with formaldehyde—as a plasticizer | 3 |
| Toluidene red pigment | 5 |
| Sec-butyl alcohol | 11.7 |
| Toluol | 10 |
| N-butyl acetate | 11.3 |
| Xylol | 9.2 |

The four ingredients last named serve as a solvent for the epichlorohydrin condensation product and the butylated resin. Prior to use, 0.7 part of diethylene triamine (as a catalyst) was added to the above composition which was then applied by brush on wooden panels. The resulting coating dried tack-free in 1 hour, had excellent gloss and good adhesion, and air dried overnight to a hard film. After air drying for 1 week interfering traces of solvent had been completely released from the coating, after which time the direct flame of a Bunsen burner was impinged on the coating for 3 minutes. The coating swelled to a voluminous char which localized the flame and protected the underlying wood surface by preventing penetration of the heat. A similar coated panel, which was not exposed to the flame, was subjected to temperature changes conducive to film checking and cracking, consisting of subjecting the panel to 20 cycles each of 1 hour at +110° F. followed immediately by 1 hour at −20° F. At the end of this testing period no indication of failure due to checking or cracking was noted, which indicates that the film possesses excellent flexibility.

*Example IV*

A coating composition was formulated by stirring the following ingredients in the proportions shown:

| | Parts |
|---|---|
| Condensation product of 4,4' dihydroxy diphenyl dimethyl methane with epichlorohydrin (medium molecular weight product—as a film former) | 30 |
| Polyphosphorylamide—as a fire-retardant | 15 |
| Diethylene triamine—as a catalyst | 0.7 |
| Methyl ethyl ketone | 28 |
| Toluol | 26.3 |

The ketone and toluol serve as a solvent mixture for the epichlorohydrin condensation product. A portion of the above composition was set aside and was found to be stable for 2 days, after which considerable thickening occurred due to the diethylene triamine catalyst. The remainder of the composition, as freshly prepared, was applied to a wood surface by brushing and the coated article was force dried at 135° F. for 24 hours. The coating was then exposed to the open flame of a Bunsen burner, whereupon the coating swelled (intumesced) to a puffed char which protected the underlying wood surface from fire damage.

Various organic solvents or organic solvent mixtures for the condensation product of 4,4' dihydroxy diphenyl dimethyl methane with epichlorohydrin may be used instead of those described in the foregoing examples. In general, and depending on the molecular weight of such condensation products, suitable solvents include organic ketones such as acetone, methyl ethyl ketone, methyl isobutyl ketone, cyclohexanone, diacetone alcohol and the like; organic esters such as methyl acetate, ethyl formate, methyl acrylate, ethyl acetate, methyl methacrylate, n-butyl acetate, ethyl lactate, diethyl carbonate and the like; organic cyclic oxides and epoxides such as propylene oxides, dihydropyran, dioxane, tetrahydropyran, tetrahydrofuran and the like; some chlorinated compounds such as chloroform, ethylene dichloride, dichloroethyl ether and the like, and organic ether alcohols such as 2-ethoxy-ethanol, 2 butoxy-ethanol and the like. Mixtures of the above solvents may also be used and often give superior results. The term "organic solvent" as used herein is intended to include mixtures of organic solvents. While the aromatic hydrocarbons are not solvents for such condensation products, they may be used in mixtures with the above-described solvents to reduce the cost of the organic vehicle. They also may be used with alcohols which are not solvents for the condensation product by themselves to produce solvent mixtures which are suitable for dissolving the condensation product. Thus solvent mixtures of 50% by weight of toluene or xylene with 50% by weight of methyl isobutyl carbinol, or with 50% by weight of n-butyl alcohol, or with 50% by weight of ethyl alcohol or with 50% by weight of isopropyl alcohol may be used successfully.

Instead of the pigments described in Examples II and III, other organic and inorganic pigments may be used. Colored, white or colorless fillers such as finely divided insoluble resins, cellulose and the like may also be employed.

Plasticizers which are compatible with the film-forming materials used in the compositions of this invention, may be incorporated therewith to improve the flexibility of films or coatings produced therefrom in those instances where increased flexibility is desired. Instead of using the plasticizer described in Example III, other compatible plasticizers may be used as for example, triphenyl phosphate, tricresyl phosphate, cresyl diphenyl phosphate, octyl diphenyl phosphate, liquid polyester resins such as the liquid reaction products of dibasic acids as, for example, sebacic acid with polyhydric alcohols such as glycerol and ethylene glycol; condensation products of aromatic sulfonamides with formaldehyde and the like. Ordinarily, plasticizers are not required in the compositions of this invention unless increasingly higher concentrations of the more or less brittle, thermosetting resins are used.

Certain polyhydric alcohols and amino acids improve the intumescing properties of the films or coatings and also in some instances serve as plasticizers for the thermosetting resins, described herein. They are, therefore, suitable for use in the compositions of the present invention. As examples of polyhydric alcohols may be mentioned pentaerythritol, dipentaerythritol, tripentaerythritol and sorbitol. As examples of amino acids may be mentioned glutamic acid. Alcohol acids such as mucic acid may also be used.

Plasticizers, pigments, fillers and other coating adjuncts, and the reaction product of phosphoryl chloride with anhydrous ammonia such as polyphosphorylamide are incorporated in the compositions of this invention by conventional methods such as simply stirring-in, or grinding-in procedures as on roller mills, in pebble mills, etc.

The solids concentration used in the coating compositions of this invention depend to a considerable extent on the method used in applying the compositions to the substrate, and to some extent on the desired film or coating thickness. Thus in those instances where the compositions are applied by spraying the solids concentration will normally be within the range of 15 to 40% by weight. Compositions containing up to 75% by weight solids are suitably applied by brushing. Compositions containing as high as 85% by weight solids are suitably applied to substrates by dipping, doctor blade application and roll coating methods. Therefore, the compositions of this invention contain, in general, from 15 to 85% by weight solids depending on the mode of application, although it will be recognized that compositions containing below 15% by weight solids will have certain utility especially in those instances where it is desirable or necessary to build up the thickness of a coating by the application of a plurality of coatings.

The proportions of the solids forming ingredients, which have been previously described, may be varied considerably. The solids portion of the compositions of this invention consist, in general, of film-forming materials and non-film-forming materials. When a hard durable film or coating is desired the amount of film-forming materials used is relatively high. Where this factor is not important smaller amounts can be used successfully. In general, the film-forming materials comprise from 50 to 90% of the solids portion of the composition and consist essentially of the condensation product of 4,4' dihydroxy diphenyl dimethyl methane with epichlorohydrin, or of mixtures thereof with the thermosetting resins. Thus, the film-forming part of the solids portion of the composition consists of 100% by weight of the epichlorohydrin condensation product, or between 10 and 100% by weight, preferably between 10 and 90% by weight, of such product, and between 90 and 0% by weight, preferably between 90 and 10% by weight, of the nitrogen-containing thermosetting resin. If more than 90% by weight of such resin is used, the films or coatings formed therefrom are usually too brittle for the uses described herein.

The non-film-forming part of the solids portion of the compositions comprises as an essential ingredient the reaction product of phosphoryl chloride with anhydrous ammonia, for example, polyphosphorylamide, and may include the coating adjuncts hereinbefore described. In general, such reaction product is employed in an amount sufficient to impart fire retardant and potential intumescing properties to a coating formed from the composition. Preferably, such product is employed together with the above film-forming materials in a weight ratio of 1:1 to 1:5. The weight ratio of 1:1 gives films or coatings having a high degree of intumescence when exposed to a flame. The weight ratio of 1:5 yields films or coatings having satisfactory intumescence in certain instances. Of course, larger ratios of the reaction product to film-forming materials may be used in some instances, but the characteristics of the film such as strength and hardness will be altered.

The non-film-forming part of the solids portion of the compositions of this invention may also comprise from 0 to 30% by weight of the compatible plasticizer, from 0 to 25% by weight of the pigments and fillers, and from 0.25 to 5% by weight of the alkaline catalyst, all of these percentages being based on the composition. It is necessary, of course, to select the proper amounts of these ingredients to conform with the proper quantities of the film-forming materials and the reaction product of phosphoryl chloride with anhydrous ammonia, as previously described, so that the films or coatings have the desired properties and the solids content will be suitable for application.

The organic vehicle of the compositions of this invention will normally comprise from 85 to 15% by weight of the entire composition and should include an organic solvent for the epichlorohydrin condensation product in an amount sufficient to dissolve such product in the vehicle.

Various changes and modifications may be made in the compositions of this invention, as will be apparent to those skilled in the art, without departing from the spirit of the invention. It is intended, therefore, that the scope of the present invention be limited only by the scope of the appended claims.

What is claimed is:

1. A potentially intumescing, fire retardant composition comprising (1) a film-forming condensation product of 4,4' dihydroxy diphenyl dimethyl methane with epichlorohydrin and (2) a water-insoluble reaction product of phosphoryl chloride with anhydrous ammonia having a nitrogen-phosphorus atomic ratio within the range of 1.5:1 to 2.0:1.

2. A composition according to claim 11, wherein the thermosetting resin is a butyl ether of melamine-formaldehyde condensation product.

3. A composition according to claim 11, wherein the thermosetting resin is a butyl ether of a urea-formaldehyde condensation product.

4. A composition according to claim 11, wherein the thermosetting resin is a butyl ether of a mixture of melamine-formaldehyde and phenyl guanamine-formaldehyde condensation products.

5. A composition according to claim 11 but further characterized in that the solids portion of the composition contains from 0.25 to 5% by weight, based on the composition, of an alkaline catalyst selected from the group consisting of quaternary ammonium hydroxides and aliphatic polyamines.

6. A substrate coated on at least one surface thereof with a potentially intumescing film comprising a condensation product of 4,4' dihydroxy diphenyl dimethyl methane with epichlorohydrin and a water-insoluble reaction product of phosphoryl chloride with anhydrous ammonia having a nitrogen-phosphorus atomic ratio within the range of 1.5:1 to 2.0:1.

7. A composition according to claim 11, but further characterized in that the solids portion of the composition contains from 0.25 to 5% by weight of diethylene triamine.

8. A composition according to claim 11, but further characterized in that the solids portion of the composition contains from 0.25 to 5% by weight of triethylene tetramine.

9. A composition according to claim 11, but further characterized in that the solids portion of the composition contains from 0.25 to 5% by weight of tetraethylene pentamine.

10. A composition according to claim 17, but further characterized in that it includes an alkaline catalyst selected from the group consisting of quaternary ammonium hydroxides and aliphatic polyamines.

11. A potentially intumescing fire retardant coating composition comprising (1) from 15 to 85% by weight of solids, said solids comprising from 50 to 90% by weight of (A) a mixture containing from 10 to 100% by weight of a film-forming condensation product of 4,4' dihydroxy diphenyl dimethyl methane with epichlorohydrin and up to 90% by weight of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) alkylated derivatives of the heat-convertible resins defined in (b), and (B) a water-insoluble reaction product of phosphoryl chloride and anhydrous ammonia, said last named reaction product and said mixture being present in said solids in a weight ratio of 1:1 to 1:5; and (2) from 85 to 15% by weight of an organic vehicle which includes an organic solvent for said first named condensation product and said thermosetting resin, said reaction product of phosphoryl chloride and anhydrous ammonia having a nitrogen-phosphorus atomic ratio within the range of 1.5:1 to 2.0:1.

12. A potentially intumescing, fire-retardant composition comprising (1) a mixture of film-forming solids of which from 10 to 100% by weight consist of a film-forming condensation product of 4,4' dihydroxy diphenyl dimethyl methane with epichlorohydrin and up to 90% by weight consist of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) alkylated derivatives of the heat convertible resins defined in (b), and (2) a water-insoluble reaction product of phosphoryl chloride and anhydrous ammonia having a nitrogen-phosphorus atomic ratio within the range of 1.5:1 to 2.0:1.

13. A substrate coated on at least one surface thereof with a potentially intumescing film comprising (1) a mixture of film-forming materials of which from 10 to 100% by weight consist of a film-forming condensation product of 4,4' dihydroxy diphenyl dimethyl methane with epichlorohydrin and up to 90% by weight consist of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) alkylated derivatives of the heat-convertible resins defined in (b), and (2) a water-insoluble reaction product of phosphoryl chloride and anhydrous ammonia having a nitrogen-phosphorus atomic ratio within the range of 1.5:1 to 2.0:1.

14. A substrate coated on at least one surface thereof with a potentially intumescing film comprising (1) a mixture of film-forming materials of which from 10 to 100% by weight consist of a film-forming condensation product of 4,4' dihydroxy diphenyl dimethyl methane with epichlorohydrin and up to 90% by weight consist of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) alkylated derivatives of the heat convertible resins defined in (b), (2) a water-insoluble reaction product of phosphoryl chloride and anhydrous ammonia having a nitrogen-phosphorus atomic ratio within the range of 1.5:1 to 2.0:1 and (3) an alkaline catalyst selected from the group consisting of quaternary ammonium hydroxides and aliphatic polyamines.

15. In the process of coating a substrate to protect it from heat and fire, the improvement which comprises the steps of applying to said substrate a coating composition comprising (1) a mixture of film-forming solids of which from 10 to 100% by weight consist of a film-forming condensation product of 4,4' dihydroxy diphenyl dimethyl methane with epichlorohydrin and up to 90% by weight consist of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) heat-convertible alkylated derivatives of the heat-convertible resins defined in (b), and (2) a water-insoluble reaction product of phosphoryl chloride and anhydrous ammonia having a nitrogen-phosphorus atomic ratio within the range of 1.5:1 to 2.0:1; and thereafter baking the resulting coating.

16. In the process of coating a substrate to protect it from fire and heat wherein the coating is allowed to air dry, the improvement which comprises applying to said substrate a coating composition comprising (1) a mixture of film-forming solids of which from 10 to 100% by weight consist of a film-forming condensation product of 4,4' dihydroxy diphenyl dimethyl methane with epichlorohydrin and up to 90% by weight consist of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) heat-convertible alkylated derivatives of the heat-convertible resins defined in (b), (2) a water-insoluble reaction product of phosphoryl chloride and anhydrous ammonia having a nitrogen-phosphorus atomic ratio within the range of 1.5:1 to 2.0:1 and (3) an alkaline catalyst selected from the group consisting of quaternary ammonium hydroxides and aliphatic polyamines.

17. A potentially intumescing, fire retardant coating composition comprising (1) a mixture of film-forming solids of which from 10 to 100% by weight consist of a film-forming condensation product of 4,4' dihydroxy diphenyl dimethyl methane with epichlorohydrin and up to 90% by weight consist of a heat-convertible alkylated urea-formaldehyde resin, (2) a water-insoluble reaction product of phosphoryl chloride and anhydrous ammonia having a nitrogen-phosphorus atomic ratio within the range of 1.72:1 to 1.8:1 and (3) an organic vehicle which includes an organic solvent for said first mentioned condensation product.

18. A potentially intumescing, fire retardant coating composition comprising (1) a mixture of film-forming solids of which a major portion consists of a film-forming condensation product of 4,4' dihydroxy diphenyl dimethyl methane with epichlorohydrin and a minor portion consists of a thermosetting resin selected from the group consisting of (a) heat-convertible phenol-formaldehyde resins, (b) heat-convertible resins of an aldehyde and a compound selected from the group consisting of urea, thiourea, guanidine, cyanamide, dicyandiamide and amino-triazines having at least two amino groups and (c) alkylated derivatives of the heat-convertible resins defined in (b), (2) a water-insoluble reaction product of phosphoryl chloride and anhydrous ammonia having a nitrogen-phosphorus atomic ratio within the range of 1.5:1 to 2.0:1 and (3) an organic vehicle which includes an organic solvent for said first mentioned condensation product.

References Cited in the file of this patent

UNITED STATES PATENTS

| Number | Name | Date |
|---|---|---|
| 2,052,886 | Leroy | Sept. 1, 1936 |
| 2,458,796 | Ott et al. | Jan. 11, 1949 |
| 2,582,181 | Trublar et al. | Jan. 8, 1952 |

OTHER REFERENCES

Mellor, Comprehensive Treatise on Inorganic and Theoretical Chemistry, vol. 8 (1928), pp. 704–720.